Figure 2:
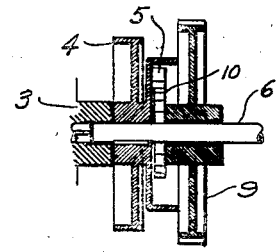

J. C. BRACKETT.
ELECTRIC MOTOR CONTROLLING MEANS.
APPLICATION FILED MAR. 15, 1911.

1,124,280.

Patented Jan. 12, 1915.
4 SHEETS—SHEET 1.

WITNESSES:
M. M. Boyle
Jacob M. Weller

INVENTOR
John C. Brackett.
BY
ATTORNEY

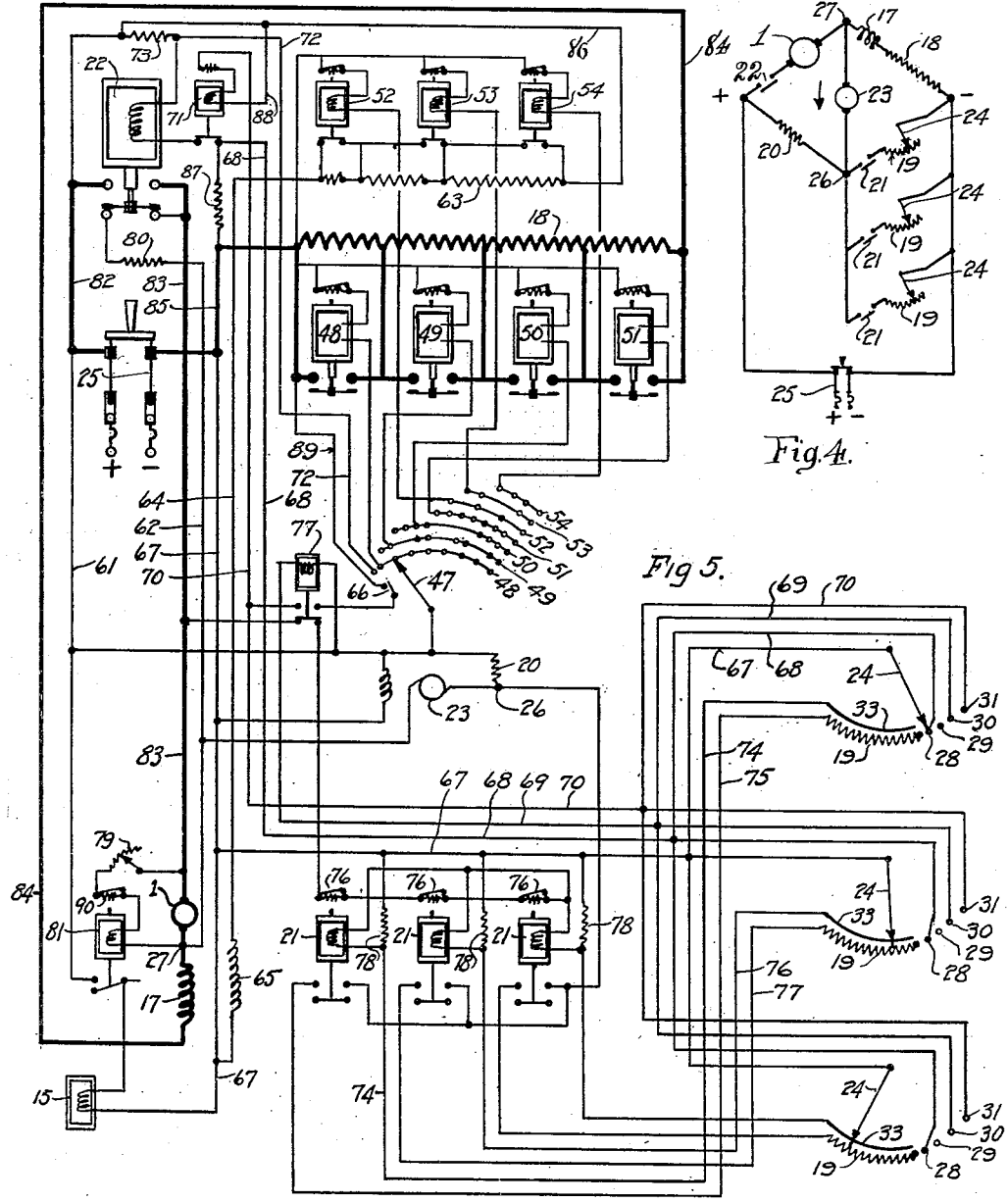

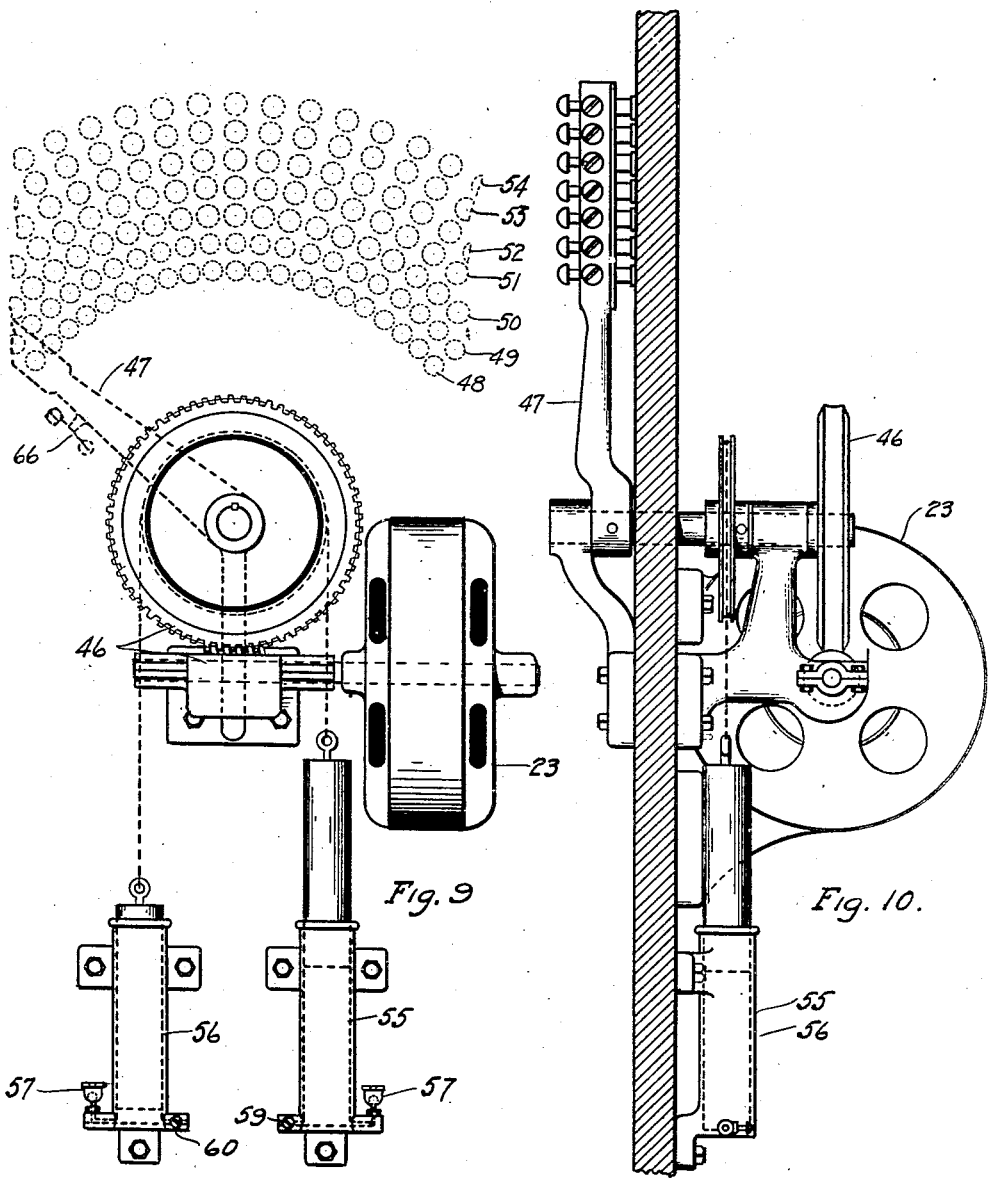

UNITED STATES PATENT OFFICE.

JOHN C. BRACKETT, OF CHICAGO, ILLINOIS.

ELECTRIC-MOTOR-CONTROLLING MEANS.

1,124,280.   Specification of Letters Patent.   Patented Jan. 12, 1915.

Application filed March 15, 1911. Serial No. 614,631.

*To all whom it may concern:*

Be it known that I, JOHN C. BRACKETT, citizen of the United States, residing at 635 Belmont avenue, Chicago, in the county of Cook and State of Illinois, have invented certain new and useful Improvements in Electric-Motor-Controlling Means; and I do hereby declare the following to be a full, clear, and exact description of the invention, such as will enable others skilled in the art to which it appertains to make and use the same.

My invention relates to controlling devices for electric motors, and has for its object to provide a new and improved device of this description, especially applicable to the control of motors driving web printing presses.

The operation of web presses with safety and the celerity necessary in a modern newspaper plant requires a system of driving and control which shall consume the least possible of the pressman's time in its manipulation; which may be operated from as many points or control stations as required; which will drive the press at a very slow speed for threading in the paper; accelerate the press smoothly and efficiently over a range of speed between the slow threading in and the slowest printing speed; accomplish a close adjustment of the printing speeds from the slowest to the maximum speed of the press; which will furnish a means of stopping the press in the least practicable time in emergencies; and which will permit turning the mechanism through a fraction of a revolution when required.

For the protection of the pressman in plating, changing rolls, and other work in otherwise dangerous positions, it is essential that from any control station the power may be cut off from the driving motor rendering the press inoperative from any station until the power circuit is again closed at the station in use.

My invention has for its object to provide means whereby the operator has only to set the lever of any controlling box at the position corresponding to the speed desired whereupon the press will be accelerated or slowed down to that speed automatically and with no further attention.

A further object of the invention is to obtain the power for the slow motion as well as the high speed from a single driving motor thus avoiding the use of auxiliary motors, double windings, and other complications, and making the necessary electrical apparatus and its connections simpler than has heretofore been possible.

I have illustrated a suitable embodiment of my invention in the accompanying drawings, in which—

Figure —1— is a view in elevation of a gear train which is preferably employed when it is desired to drive the press or other machine at low speed. Figs. —2— and —3— are sectional details of the clutches controlling said gearing. Fig. —4— is a diagrammatic view showing an arrangement of motor control circuits employed. Fig. —5— is a detail plan of all electrical connections. Figs. —6—, —7— and —8— show a plan, a section and an end view respectively of a controlling box. Figs. —9— and —10— are rear and side elevations respectively of a motor driven rheostat employed.

The essential parts of this system of press control are: A method of gearing a single motor to the press so that it may drive the press shaft either directly or through a set of reducing gears, referred to below as "motor gearing." A set of electrical connections to said motor, referred to below as "main motor connections," comprising an electrically operated main motor switch, regulating resistance for main motor field and armature, and switches for varying these resistances. A set of electrical connections for the control, from different points on the press, of the electrically operated main motor switch, referred to below as "main switch control circuits." A set of connections for the control of an electrically operated clutch forming part of the gearing between press and main driving motor, referred to below as "connections to clutch." A set of electrical connections for the control, from different points on the press, of the switches which vary the main motor armature and field resistance, making the position of these dependent on the position of the control lever of the station in use, referred to below as "rheostat and connections." A set of relays and connections for making the position of the said switches which vary the main motor armature and field resistance independent of the position of the controller levers of control boxes other than the one in use. These are described as "control switches and connections."

*Motor gearing.*—Referring to Fig. —1—, I have shown a motor 1, driving a pinion 2 through an electrically operated friction clutch or equivalent device, one member 3 of which is keyed to the motor shaft, and the other, 4, is keyed to the shaft 6, on which the pinion 2 is mounted. The pinion 2 meshes with the gear 7 which drives the press-shaft 8. The gear 9 is loose on shaft 6 but carries on its hub a ratchet 10, Figs. —2— and —3—, which engages the pawls 5, mounted on the clutch member 4, thereby driving the shaft 6. Thus, with the members 3 and 4 disengaged, power is transmitted through the motor pinion 11, gear 12, shaft 13, pinion 14 and gear 9 to the shaft 8, at a reduced speed. Gradual engagement of the members 3 and 4, for example, by excitation of a solenoid 15 controlled by a dashpot 16 smoothly accelerates shaft 6 to a speed equal to that of the motor, thus carrying pawls 5 ahead of ratchet 10, which continue to revolve slowly. To return the press shaft from high to low speed, the members 3 and 4 are disengaged and the press slows down by inertia until the shaft 6 reaches the speed of gear 9. Pawls 5 then engage driving shaft 6 through gears 11, 12, 14 and 9 as before.

*Main motor connections.*— These are shown diagrammatically in Fig. —4— and in detail in Fig. —5—. Referring to Fig. 5, a knife or hand switch 25 connects the main motor to a source of potential marked + and —, the circuit being from + through + side of knife switch 25, wire 82, upper contacts of solenoid switch 22, (described later,) wire 83, motor armature 1, motor series field 17, wire 84, resistance 18, wire 85, to — through switch 25. Solenoid switch 22 is a single pole, double throw relay, the upper contacts of which are closed when the operating coil is energized, lifting the core, and the bottom contacts of which are closed when no current is in the operating coil, and the core is dropped to the lower position by its own weight. When the bottom contacts of switch 22 are closed in this manner a circuit is complete from the terminals of motor 1 through the dynamic brake resistance 80, the use of which will be described later.

The resistance 18 is divided into 15 grids or units, one of which is bridged by the solenoid switch 48, two by switch 49, four by switch 50 and eight by switch 51. The contacts of these switches are closed when their operating coils are energized, in a manner described later. With all four switches open, fifteen grids of resistance are in the main motor circuits. Closing switch 48 short-circuits one of these, leaving fourteen. Opening switch 48 and closing switch 49 short circuits 2 grids, leaving 13 in the main motor circuit, and in like manner:

| Closing | short-circuits | grids, leaving |
|---|---|---|
| 48 and 49 | 3 | twelve, |
| 50 | 4 | eleven, |
| 50 and 48 | 5 | ten, |
| 50 and 49 | 6 | nine, |
| 50, 49 and 48 | 7 | eight, |
| 51 | 8 | seven, |
| 51 and 48 | 9 | six, |
| 51 and 49 | 10 | five, |
| 51, 48 and 49 | 11 | four, |
| 51 and 50 | 12 | three, |
| 51, 50 and 48 | 13 | two, |
| 51, 50 and 49 | 14 | one, |
| 51, 50, 49 and 48 | 15 | none. | in the motor series circuit.

The main motor shunt field is energized from + through knife switch 25, wire 82, wire 86, resistance 63, wire 64, shunt field coils 65, and wire 67 to —. Resistance 63 is divided into seven units, these being bridged, one by relay 52, two by relay 53 and four by relay 54. These relays are arranged to be closed when there is no current in their operating coils. With all three relays closed no current flows through resistance 63. With

| | | | |
|---|---|---|---|
| 52 | open, | one grid | is put into motor field circuit. |
| 53 | " | two grids are | " |
| 52 and 53 | " | three " | " |
| 54 | " | four " | " |
| 52 and 54 | " | five " | " |
| 53 and 54 | " | six " | " |
| 52, 53 and 54 | " | seven " | " |

The manner of opening and closing these relays in proper succession will be described later.

*Main switch control circuits.*—In Figs. —6—, —7— and —8— I have illustrated a form of control box, from which the operation of the main motor is directed. These controllers are placed at convenient points on the press, from three to twelve being installed, according to the size machine to be driven. An operating lever 24, free to swing on a steel pivot 41, carries contact brushes 34 and 35, which are connected together electrically, and which may be swung into contact with brass studs 31, 30, 29, 28 or 32, or upper contact strip 33. The electrical connections to brushes 34 and 35, and to studs and contact strip 33 are brought in lead-covered cable through flexible conduit 45, and the whole is inclosed in a pressed brass case 40, and mounted on a slate slab 39. Studs 28, 30 and 31 in conjunction with control lever 24 and brushes 34 and 35 operate the main switch 22. Stud 29 is a dead or neutral point, and the function of the remaining points will be described later. For simplicity in Fig. —5—, contact brushes 34 and 35 are omitted, and control lever 24 is shown as connecting directly to studs, contact strip, etc., and will be referred to in this way in the discussion of this diagram.

Referring to Fig. —5— rheostat arm 47 controls the main motor resistance as described later. When arm 47 is in the extreme left hand position, all the main motor armature resistance is in circuit and field resistance short circuited, running the motor at the slowest speed, and a small auxiliary contact 66, (see also Fig. —9—) is closed.

Swinging control lever 24 into contact with stud 28 completes a circuit from + through wire 61, rheostat arm 47, wire 72, coil of switch 22, contacts of relay 71, wire 68, stud 28, control lever 24 and wire 67 to —, closing switch 22 and completing main motor circuit, starting the motor. Removing control lever from point 28 and rheostat arm 47 from extreme left hand position does not open switch 22, as a circuit is still complete from + through wire 82, resistance 73, coil of switch 22, bottom contacts of relay 71 and resistance 87 to —. This circuit permits enough current to flow through coil of switch 22 to hold the switch closed, but not enough to lift it closed from an open position. Either resistance, 87 or 73 is sufficient to accomplish this reduction of current singly, so that it will be noted that with rheostat arm 47 in any position other than the extreme left hand one, main switch 22 cannot be closed from any controller, as swinging any control lever 24 into contact with stud 28 completes only a circuit from + through wire 82, resistance 73, coil of switch 22, bottom contacts of relay 71, wire 68, control lever 24 and wire 67 to —. This circuit will not pass sufficient current to raise switch 22 from an open to a closed position. Swinging control lever 24 into contact with stud 31 completes a circuit from + through wires 82 and 88, coil of relay 71, wire 70, stud 31, control lever 24 and wire 67 to —, lifting open bottom contacts of relay 71, and breaking all connection to switch 22, stopping the motor at once. Swinging control lever 24 into contact with stud 30 completes a circuit from + through wire 61, coil of relay 77, wire 69, control lever 24, and wire 67 to —, lifting the core of relay 77, opening the bottom contacts, and closing the top ones. Opening the bottom contacts causes rheostat arm 47 to travel back to the extreme left hand position, the manner of accomplishing this being described under "rheostat and connections". Closing the upper contacts of relay 77 in this manner completes a circuit from + through wires 82 and 88, coil of relay 71, wire 70, upper contacts of relay 77 to contact 66. When rheostat arm 47 reaches the extreme left hand position, closing 66, this circuit is completed on through 66, and wires 89 and 85 to —, lifting relay 71 and opening switch 22, stopping main motor, first having slowed it down to the minimum speed.

*Connections to clutch.*—With switch 22 closed, a circuit is complete from + through wire 82, upper contacts of switch 22, wire 83, resistances 79 and 90, coil of relay 81, series field 17, wire 84, resistance 18 and wire 85 to —. Resistance 79 is adjustable by hand, and resistance 90 is bridged by an upper auxiliary contact of relay 81, so as to be in circuit only when relay 81 is closed, its function being to cut down the current through relay 81 to the minimum necessary to hold same closed. Resistance 79 is adjusted so that when all resistance 18 is in the motor circuit, not enough current will flow through relay 81 to close it, but when one or more sections of resistance 18 are cut out, raising the potential at the motor terminals and the speed of the motor, sufficient current will flow through relay 81 to lift it. This completes a circuit from + through wire 61, bottom contacts of relay 81, solenoid 15 to — through wire 67, closing the main motor clutch, and putting the press on high speed as described under "Motor Gearing" above.

*Rheostat and connections.*—In Figs. —9— and —10— I have illustrated the details of rheostat motor 23. This is a fractional horse power multipolar motor with a very strong field, designed to operate on small armature current. A worm and gear 46 transmits the motion to a rheostat lever 47 traveling over a series of contacts 48–54, only certain ones of which are connected electrically, as will be described, the remainder being dead buttons supplied to furnish a smooth track for rheostat contacts. The rate of travel of the rheostat arm is regulated by two dash pots 55 and 56, the plungers of which are permitted by ball valves 57 to drop freely of their own weight, but which must be retracted at a rate adjustable by inlet valves 59 and 60 on the cylinders 55 and 56. When the lever 47 is moving from left to right, accelerating the main motor, plunger 56 is retracted and when lever 47 is moving from right to left, decelerating the main driving motor, plunger 55 is retracted. The rate of acceleration is adjusted by opening or closing inlet valve 60 and the rate of deceleration adjusted independently by means of intake screw 59. Valve 60 is usually set so that the rheostat may move from slow to high speed in about 20 seconds, while valve 59 is set to permit the total reverse movement to take place in 5 or 6 seconds.

Main motor resistance control switches 48, 49, 50, 51, 52, 53 and 54 have their operating coils connected at the series of concentric contacts mentioned, these being numbered the same as the switch with which they are associated. The circuit through any of these switches, as for example 48, with rheostat arm 47 in contact with studs 48, is from + through wire 61, rheostat arm 47, stud 48, coil of switch 48 to — through wire 85. An auxiliary switch is furnished above each of these resistance control switches, to insert resistance into the coil circuit when the switch is closed, cutting down the current to the minimum required to hold the switch in the upper or closed position.

Movement of arm 47 to the right energizes motor main resistance switches and motor shunt field resistance switches, regulating these two resistances as follows: Switch 48 is connected to short circuit one grid or unit of resistance, switch 49, two grids, 50, four grids and 51, eight grids. Field switch 52 is connected to open circuit one unit of field resistance, 53, two units and 54, four units, as mentioned in discussion of main motor circuits. With arm 47 in first position left all switches are down leaving fifteen grids in series with motor armature, and no resistance in shunt field, switches 52, 53 and 54 being closed by gravity and opened by excitation of their coils. With arm 47 in second position switch 48 is closed, leaving fourteen grids or units of resistance in the armature circuit, third position closes switch 49 and opens switch 48, leaving thirteen grids in circuit, fourth position closes switch 48 and maintains switch 49 closed, thus leaving twelve grids in circuit; fifth position opens switches 48 and 49 and closes switch 50, leaving eleven grids; sixth position closes also switch 48, leaving ten grids; seventh position closes switch 49, holds switch 50 closed and opens switch 48, leaving nine grids; eighth position holds switches 50 and 49 closed and closes switch 48, leaving eight grids; ninth position opens switches 48, 49 and 50, closes switch 51 leaving seven grids; tenth position holds switch 51 closed, opens switch 52 and closes 48 leaving six grids and inserting one unit field resistance; eleventh position holds switch 51 closed, opens switch 48, closes switch 52, closes switch 49 and opens switch 53, leaving five grids and two units field resistance, twelfth position holds switches 51 and 49 closed and 53 open, and closes switch 48 and opens switch 52, leaving four grids and three field units; thirteenth position holds switch 51 closed, opens switches 48 and 49, and opens switches 52 and 53, closes switch 50 and opens switch 54, leaving three grids and four field units; fourteenth position holds switches 50, 51 and 54 as before and opens switch 52 and closes switch 48 leaving two grids and five field units; fifteenth position holds switches 50, 51 and 54 as before, opens switch 48, closes switch 52, closes switch 49 and opens switch 53 leaving one grid and six field units; sixteenth position holds switches 49, 50, 51, 53, 54 as before and opens switch 52 and closes switch 48 cutting out the last grid of armature resistance and leaving seven field units in the circuit from + through wires 82, 86, field resistance 63, wire 64, shunt field 65 and wire 67 to —.

In Fig. —4— are shown diagrammatically the connections to the armature of rheostat operating motor, 23. The main motor circuit is shown at the top of the diagram, from + through 25, switch 22, armature 1, point 27, series field 17 and regulating resistance 18 to —. Across the mains is connected also a circuit from + through a manually adjustable resistance 20, point 26, electrically operated relay 21, resistance 19, control lever 24 to —.

The several relays 21 are interconnected in a manner described later so that but one at a time may be closed. Thus only one resistance 19 can be in the above circuit at a time. Resistance 19 is contained in the controller, see Fig. —6—. It is wound on two spools 43, which are mounted on fan shaped pieces of fiber 91, upon which are carried leads or taps connecting with studs 32. For convenience in installation, coils 19, spools 43, fiber supports 91, and leads 44 are assembled as a unit, the whole being treated with insulating enamel. Control lever 24 may be lifted clear of notches 36 and set in contact with any stud 32, thus connecting it with any desired point on resistance 19. The stem of lever 24 is made of a strip of soft steel 92, which has spring enough to permit lifting brush 34 out of contact with studs 33, and wedge 37 clear of notches 36, so that lever 24 may be set in contact with any stud 32 without first rubbing across the adjacent studs. Lifting lever 24 also puts brush 35 in contact with a strip of copper 33, extending above contacts 32. The function of this contact will be described later.

Referring again to Fig. —4— it will be seen that with a constant potential or pressure at points marked + and —, the potential of point 27 with switch 22 closed will vary with the amount of the resistance 18, or in other words, as the speed of armature 1, as the potential of point 27 equals the line pressure, from + to —, less the potential across the motor armature 1, and the speed of a direct current motor with constant field varies almost in proportion to the armature potential.

With any one switch 21 closed, and resistance 20 set at a given value and not varied, the potential of point 26 varies as the amount of the resistance 19 associated with the closed switch 21. The potential of point 26 is, therefore, controlled by the position of any one control lever 24, it being a maximum when the lever 24 in use is put in the extreme left hand position, and a minimum when the lever 24 is in the extreme right hand position.

When the potential of point 27 is higher that that of point 26, current will flow from 27 to 26 through armature of rheostat motor, 23, in the direction of the arrow point. Motor 23 is connected so that a current in this direction revolves the armature in the direction necessary to move rheostat arm 47 from left to right, decreasing resistance 18 as described above. In reverse manner, raising the potential of point 26 above that of point 27 rotates armature 23 in the reverse direction, increasing resistance 18.

With switch 22 closed and motor 1 running at the slowest speed, with all of resistance 18 in circuit, one switch 21 is closed, and the corresponding control lever 24 placed in the extreme right hand position, putting all of resistance 19 into the lower circuit. Resistance 20 is now adjusted and fixed so that no current flows between points 26 and 27, or so that their potentials are equal. If now lever 24 is moved to any position further to the left, the potential of point 26 is lowered, and current flows from 27 to 26, rotating motor 23 and cutting down resistance 18 in the process, raising the speed of motor 1. This continues until point 27 is lowered in potential sufficiently so that not enough current flows from 27 to 26 to operate motor 23. Motor 23 then stops, having reduced resistance 18 the desired amount. Further movement of lever 24 to the left, in this manner reduces resistance 18 still further, running motor 1 at higher speed. If now control lever 24 is moved back toward the right, the potential of point 26 is raised above that of point 27, and current flows from 26 to 27, rotating motor 23 so as to reinsert resistance 18, reducing the speed of the motor, until point 27 reaches nearly the potential of point 26, when the motor 23 stops, having reinserted the desired amount of resistance 18. Thus, with resistance 20 fixed, the amount of resistance 18, and the speed of motor 1, is regulated by the position of control lever 24, each position of which is thus made to correspond to a certain press speed.

From the above discussion will be seen the necessity of establishing the condition that but one switch 21, at a time, may be closed. This is accomplished as follows:

*Control switches and connections.*—Control relays 21, Fig. —5—, consist of single pole relays, closed when the core is drawn up and opened by gravity. At the top is an auxiliary contact, open when the core is drawn up and which bridges a resistance 76. Putting any control lever 24, the top one in Fig. —5— for instance, in contact with copper strip 33 completes a circuit from + through wire 82, switch 22, wire 83, bottom contacts of relay 77, upper contacts of relays 21, (these being closed), coil of left hand switch 21, wire 74, contact 33, control lever 24 and wire 67 to —, lifting left hand switch 21. If now control lever 24 is removed from stud 33, the circuit through left hand switch 21 is still complete to — through resistance 78 and wire 67, this circuit permitting enough current to flow to hold switch 21 in a closed position, but not enough to lift it. Resistances 76 and 78 are proportioned as follows:

Relay 21 will lift with resistance 76 in series.
" " " not lift with two resistances 76 in series.
" " " stay up with resistances 76 and 78 in series.
" " " not stay up with two resistances 76 and 78 in series.

If now, any relay, the left hand one for instance, is closed in the manner described, and a second relay is closed, in a similar manner by the corresponding control lever, the circuit through the relay first closed will be from + through wire 82, switch 22, wire 83, relay 77, two resistances 76, resistance 78, wire 67 to —. This circuit will not pass enough current to hold the first relay closed, so it will open at once when the second one is closed.

Figure 1:
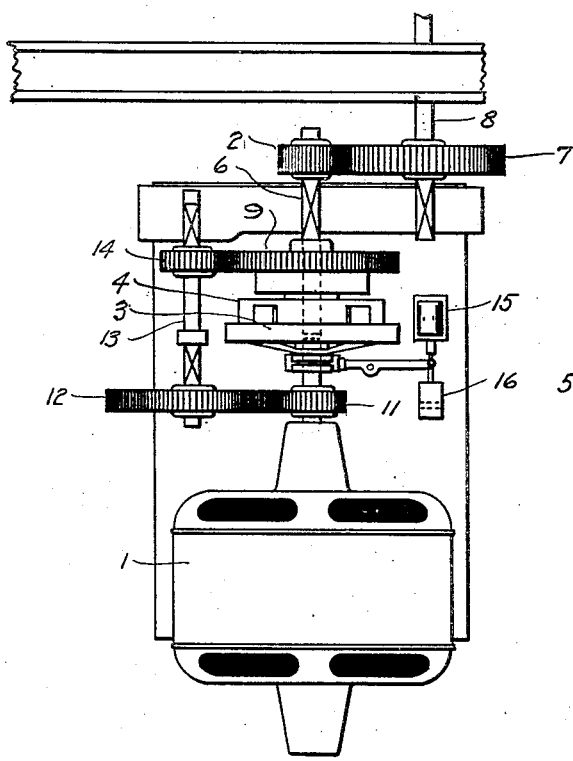
Figure 3:
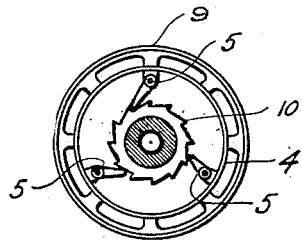
Figure 6:
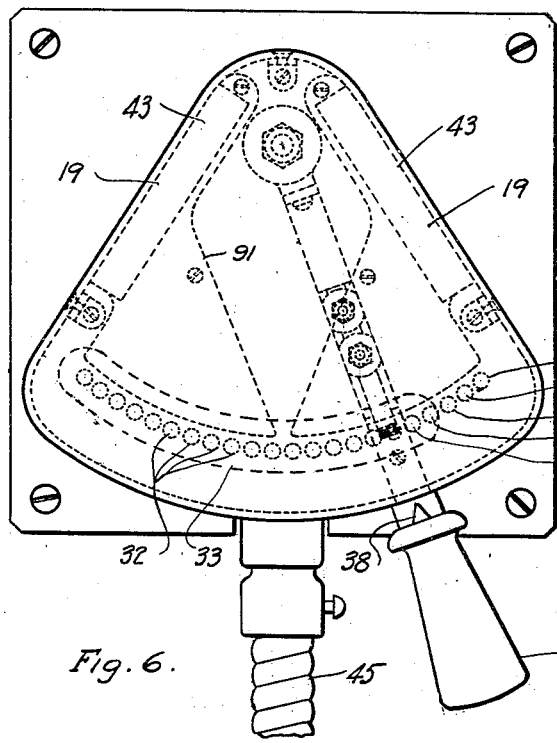
Figure 7:
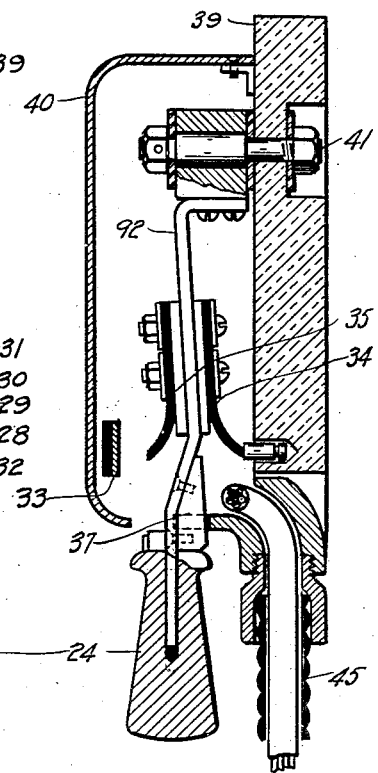
Figure 8:
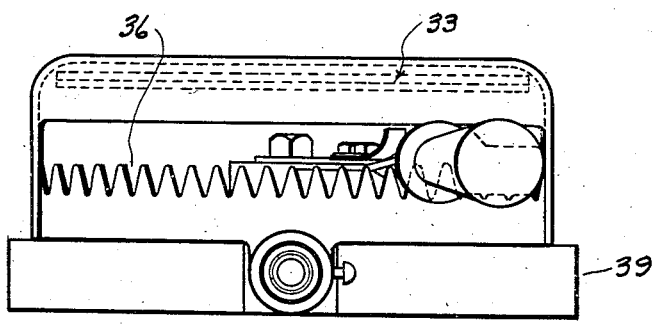

*Operation of the system.*—The operations accomplished by this device are as follows: Starting the press from any station; accelerating the press to any speed from any station; setting the press at any other speed from the same, or any other station, as often as desired; stopping the press gradually first having slowed it down to the lowest speed; stopping the press quickly in an emergency; locking the press from any station so that it cannot be started from any other station. The accomplishment of these operations will be described in detail as follows:

*Starting the press.*—Any control lever 24 is swung into contact with point 28, completing the main switch circuit from + through wire 61, rheostat arm 47, wire 72, switch 22, wire 68, control lever 24 and wire 67 to —, closing switch 22 and starting motor 1, driving the press at slow speed through gears 1, 12, 14, 9 and 2, Fig. 1. If power is put on the system by closing switch 25 with rheostat arm 47 in a position cutting out part of resistance 18, a circuit is complete from + (Fig. —4—) through resistance 20, motor 23, series field 17 and resistance 18 to —, actuating motor 23 to insert all of resistance 18 into the main motor circuit, which must be done before it is possible to close switch 22, starting motor 1, in the above manner.

*Accelerating the press.*—Control lever 24 of any station (Figs. —6— and —7—) is lifted into contact with strip 33, closing the corresponding control switch 21, and is swung over the point 32 corresponding to the speed desired, lowering the potential of point 26 (Fig. —4—) below that of point 27 and actuating motor 23 to remove resistance 18 from the circuit of motor 1, accelerating same. When the first section of resistance 18 is removed, the potential across the terminals of motor armature 1 (Fig. —5—) becomes great enough to lift relay 81, closing the circuit of solenoid 15, and closing clutch 3—4, Fig. —1—, driving the press on high gear, or directly from gear 2. Further removal of resistance 18 by the same movement of control lever 24 accelerates the press motor 1 to the desired speed.

*Manipulation of press speed while running.*—The press may be set at any other speed, higher or lower, than the one at which it is running by lifting control lever 24 of the controller in use, (Fig. —7—), into contact with strip 33, closing the corresponding switch 21 as described, and opening the one previously in use. Control lever 24 is then set at the speed desired, raising or lowering the potential of point 26, (Fig. —4—) with regard to point 27, according to whether the new setting of lever 24 corresponds to a lower or higher speed than that at which the motor is operating. This actuates motor 23 in the proper direction to remove or reinsert the necessary amount of resistance 18 to set the press motor 1 at the speed desired.

*Gradual stop.*—Lever 24 of any controller is swung into contact with gradual stop button 30, completing a circuit from + through wire 61, relay 77, wire 69, stud 30, control lever 24 and wire 67 to —, raising relay 77. Opening the bottom contacts of 77 in this manner opens all control switches 21, (Fig. —5—), leaving a circuit complete (Fig. —4—) from + through resistance 20, motor 23, field 17, resistance 18 to —, actuating motor 23 to remove resistance 18, slowing main motor. When rheostat arm 47 reaches the extreme left hand position, inserting the last of resistance 18, it closes contact 66, completing a circuit from + through wires 82 and 88, relay 71, wire 70, top contacts (closed) of relay 77, contact 66 and wires 89 and 85 to —, opening relay 71, dropping main switch 22 and stopping motor 1.

*Emergency stop.*—Swinging any control lever 24 into contact with stud 31 completes a circuit from + through wires 82 and 88, relay 71, wire 70, stud 31, control lever 24 and wire 67 to —, opening relay 71 and dropping main switch 22, cutting the power off from motor 1. Dropping switch 22 also connects dynamic brake resistance 80 across the motor terminals, causing the motor, which is being driven now by the momentum of the press rolls, to act as a generator, sending a strong current through resistance 80 and armature 1, making a powerful brake of the latter, the strength of which may be adjusted as desired by varying the amount of resistance 80.

*Safety device.*—To insure the safety of an operator in plating, changing rolls, it is desirable that from any station the power may be cut off from motor 1 in such a manner that the motor cannot be started from any other station. This is accomplished very simply by swinging control lever 24 of the station in use into contact with stud 31, opening relay 71 as described, and rendering it impossible to close main switch 22 until lever 24 is again swung out of contact with point 31.

I claim as my invention:

1. Motor speed controlling means comprising a plurality of controlling boxes each containing a single circuit controlling means for controlling a single motor, and means for automatically vesting the control to regulate the motor speed in one only of said boxes whereby interference or control from more than one at a time of said stations is prevented, and means at each control station whereby the motor may be stopped at any time regardless of which station is at such time vested with the control.

2. In combination, a motor; circuits therefor; a regulating resistance for the motor; a plurality of auxiliary resistances; an electrical operating mechanism for varying the said regulating resistance; a control mechanism for varying each of said auxiliary resistances; and circuits connecting the said operating mechanism with each of the said control mechanisms, whereby the manipulation of any one of the said control mechanisms will actuate the said operating mechanism to vary the regulating resistance.

3. In combination, a motor; circuits therefor; a regulating resistance for the motor; a plurality of auxiliary resistances; in multiple with each other; an electrical operating mechanism for varying the said regulating resistance; a control mechanism for varying each of said auxiliary resistances; and circuits connecting the said operating mechanism with each of the said control mechanisms, whereby the manipulation of any one of the said control mechanisms will actuate the said operating mechanism to vary the regulating resistance.

4. In combination, a motor; circuits therefor; a regulating resistance for the motor in series with the field winding thereof; a plurality of auxiliary resistances in multiple with each other; an electrical operating mechanism for varying the said regulating resistance; a control mechanism for varying each of said auxiliary resistances; and circuits connecting the said operating mechanism with each of the said control mechanisms, whereby the manipulation of any one of the said control mechanisms will actuate the said operating mechanism to vary the regulating resistance.

5. In combination, a motor; circuits therefor; a regulating resistance for the motor;

a plurality of auxiliary resistances; an electrical operating mechanism for varying the said regulating resistance; circuits connecting the said operating mechanism to the motor circuit in balanced relation to the regulating resistance and the said auxiliary resistances, whereby the current in the said motor circuit will actuate the said operating mechanism upon an unbalancing of the said regulating and auxiliary resistances; and a separate varier for each of the auxiliary resistances, whereby any one of the latter may be varied to effect the said unbalancing.

6. In combination, a main motor; a regulating resistance therefor; an auxiliary motor controlling the main motor; interconnected circuits through which both of said motors are actuated; a plurality of auxiliary resistances connected to the said auxiliary motor in balancing relation to the regulating resistances; circuits whereby the said auxiliary resistances normally maintain the auxiliary motor inoperative; and a separate varier for each of the auxiliary resistances; the last named circuits serving to render the auxiliary motor operative upon the varying of any of the auxiliary resistances by the varier therefor.

7. In combination, a main motor; a regulating resistance therefor; an auxiliary motor controlling the main motor; interconnected circuits through which both of said motors are actuated; a plurality of auxiliary resistances connected in parallel to the said auxiliary motor in balancing relation to the regulating resistances; circuits whereby the said auxiliary resistances normally maintain the auxiliary motor inoperative; and a separate varier for each of the auxiliary resistances, the last named circuits serving to render the auxiliary motor operative upon the varying of any of the auxiliary resistances by the varier therefor.

8. In combination, a main motor; a regulating resistance for the field winding thereof; an auxiliary motor controlling the main motor; interconnected circuits through which both of said motors are actuated; a plurality of auxiliary resistances connected to the said auxiliary motor in balancing relation to the regulating resistances; circuits whereby the said auxiliary resistances normally maintain the auxiliary motor inoperative; and a separate varier for each of the auxiliary resistances, the last named circuits serving to render the auxiliary motor operative upon the varying of any of the auxiliary resistances by the varier therefor.

9. In combination, a main motor; an auxiliary motor controlling the main motor; interconnected circuits through which both of said motors are actuated; a main resistance and a plurality of auxiliary resistances connected to the said auxiliary motor in balancing relation to the terminals of the said motor, the said resistances proportioned normally to maintain the auxiliary motor inoperative; an independent varier for each auxiliary resistance; and a common circuit connecting the said resistances, whereby the current in the said circuit will operate the auxiliary motor upon the varying of any one of the auxiliary resistances by the varier therefor.

10. In combination, a main motor; an auxiliary motor controlling the speed thereof; a variable resistance governing the said auxiliary motor, the said resistance comprising a plurality of separable sections, relays controlling the connections of the respective sections current-closing controllers for the respective relays; circuits connecting the said motors, resistances and relays in operative relation, and connecting the relays with the said controllers; a motor-starting magnetically actuated switch interposed between the said relay circuits and the main motor; and an auxiliary magnet circuit connected to the said switch and adapted to maintain the same in its closed position after the switch has been actuated by one of the relay circuits.

11. In combination, a main motor; an auxiliary motor controlling the speed thereof; interconnected circuits connecting the said motors in operative relation; a plurality of variable resistances jointly connected to one of the said circuits and adapted, upon a variation of their resistance, to cause the said circuit to actuate the auxiliary motor; a manually actuated varier for each resistance; control relays connected to the said interconnected circuits and to the respective variers; and circuit connections controlled by the said variers for actuating the said control relays to limit the effective inclusion of resistance to that of only one of the said plurality of variable resistances.

12. In combination, a motor and controlling means therefor disposed substantially in Wheatstone bridge connections, the said connections including armature and field windings of the said motor disposed respectively in contiguous arms of the said bridge, balancing resistances disposed in the other two arms of the said bridge, a resistance-controlling motor bridged across the said bridge, and a plurality of auxiliary resistances connected in parallel with the arm of the said bridge opposite to that containing the said armature winding.

13. In combination, a motor and controlling means therefor disposed substantially in Wheatstone bridge connections, the said connections including armature and field windings of the said motor disposed respectively in contiguous arms of the said bridge, balancing resistances disposed in the other two arms of the said bridge, a resistance-controlling motor bridged across the said bridge, and a plurality of auxiliary resistances connected in parallel with the arm of the said bridge opposite to that containing the said armature winding, and means for interchangeably interposing any one of said auxiliary resistances in the last-named arm.

In testimony whereof I have signed my name in presence of two subscribing witnesses.

JOHN C. BRACKETT.

Witnesses:
M. M. BOYLE,
H. L. HALE.